(12) United States Patent
Saito

(10) Patent No.: US 8,261,107 B2
(45) Date of Patent: Sep. 4, 2012

(54) PRINTING DEVICE CONTROLLER AND PRINTING DEVICE

(75) Inventor: Takeshi Saito, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 388 days.

(21) Appl. No.: 12/710,257

(22) Filed: Feb. 22, 2010

(65) Prior Publication Data

US 2010/0218025 A1    Aug. 26, 2010

(30) Foreign Application Priority Data

Feb. 24, 2009    (JP) .................. 2009-041050

(51) Int. Cl.
*G06F 1/00*    (2006.01)
*G06F 1/26*    (2006.01)
*G06F 1/32*    (2006.01)

(52) U.S. Cl. ........................ 713/300; 713/320

(58) Field of Classification Search .................. 713/300, 713/320
See application file for complete search history.

(56) References Cited

U.S. PATENT DOCUMENTS

| 5,721,930 | A | 2/1998 | Kasuga | |
| 7,222,250 | B2 * | 5/2007 | Matsubara | 713/320 |
| 7,321,973 | B2 * | 1/2008 | Choi et al. | 713/320 |
| 2004/0057069 | A1 * | 3/2004 | Ikeda | 358/1.14 |

FOREIGN PATENT DOCUMENTS

| JP | 05-019881 A | 1/1993 |
| JP | 2003-122461 A | 4/2003 |
| JP | 2004-046324 A | 2/2004 |
| JP | 2004-112718 A | 4/2004 |

* cited by examiner

*Primary Examiner* — Mark Connolly
(74) *Attorney, Agent, or Firm* — Kilpatrick Townsend & Stockton LLP

(57) ABSTRACT

A printing device controller provided with a first computational processing unit that performs overall control of the device as a whole and a second computational processing unit that consumes less power than the first computational processing unit, the printing device controller including: a RAM (Random Access Memory) having a self-refresh mode; a main control unit whose main processing constituent is the first computational processing unit; and a sub control unit whose main processing constituent is the second computational processing unit. When an instruction to enter a power-saving state is inputted, the main control unit causes the first computational processing unit to store information necessary for returning from the power-saving state into a storage unit and then causes the RAM to enter the self-refresh mode, and the sub control unit then powers off the first computational processing unit.

10 Claims, 6 Drawing Sheets

PRINTING DEVICE CONTROLLER AND PRINTING DEVICE

BACKGROUND

1. Technical Field

The present invention relates to a printing device controller and a printing device, and particularly relates to a printing device controller and printing device provided with a first computational processing unit that performs overall control of the device as a whole and a second computational processing unit that consumes less power than the first computational processing unit.

2. Related Art

From an ecological standpoint, demands with respect to power conservation are increasing, and such demands apply to printers such as printing devices as well. While past types of power-saving modes, where power distribution to the primary control circuit portions such as a CPU is maintained while stopping the supply of power to other peripheral elements, enabled easy returns from the power-saving mode, and reducing power consumption in the primary control circuit portions in order to achieve further energy conservation is also coming into consideration. However, stopping the supply of power to the primary control circuit results in a problem whereby information stored in the cache of a processing circuit such as a CPU, setting values stored in the register of an integrated circuit for controlling the various elements, and the like are lost, and returning from the power-saving mode thus takes time.

In order to address this problem, measures for holding the CPU cache, the setting values stored in the registers of the various modules, and so on are being taken. For example, JP-A-2004-112718 discloses copying, when still operating in the normal mode prior to entering a power-saving mode, all or part of an operating system, basic application programs, and the like pre-stored in a ROM into an external RAM that is not powered down, and then reading out and executing the code, data, and so on from the external RAM during the process for returning from the power-saving mode.

Meanwhile, JP-A-2003-122461, for example, discloses dividing a semiconductor integrated circuit into an internal logic block and an input/output pad cell block, continuously linking the state of the D flip-flop in the internal logic block to the RS latch of the input/output pad cell block, and saving the state of the D flip-flop in the input/output pad cell block when the supply of power to the internal logic block is stopped during the power-saving state.

In the aforementioned JP-A-2004-112718 and JA-A-2003-122461, the information necessary for returning from the power-saving state is continuously backed up. While these techniques are useful because it is always possible to enter the power-saving mode, it is necessary to steadily increase the processing for making backups, provide a separate storage medium for making backups, and so on, resulting in unavoidable cost increases due to circuitry changes, increases in the circuit scale, improvements in processing capabilities so that the primary computational processes are not strained by the additional processing, and so on.

SUMMARY

An advantage of some aspects of the invention is to provide a printing device and a controller for the same in which power consumption can be contributed to by reducing the power consumed without greatly increasing the circuit scale, increasing the amount of steady processing, and so on, and a power-saving state can be entered and returned from smoothly.

A printing device controller according to an aspect of the invention is provided with a first computational processing unit that performs overall control of the device as a whole and a second computational processing unit that consumes less power than the first computational processing unit, and includes a RAM having a self-refresh mode, a main control unit whose main processing constituent is the first computational processing unit, and a sub control unit whose main processing constituent is the second computational processing unit.

When an instruction to enter a power-saving state is inputted, the main control unit causes the first computational processing unit to store information necessary for returning from the power-saving state into a storage unit and then causes the RAM to enter the self-refresh mode. After this, the sub control unit, which carries on the processing from the main control unit, powers the first computational processing unit off. In other words, the main control unit controls the entry into the power-saving state up until midway, whereafter the sub control unit picks up that control from midway.

According to this configuration, processing that can be executed by both the first computational processing unit and the second computational processing unit is executed by the first computational processing unit, whose processing capability is higher, and processing that can only be executed by the first computational processing unit with difficulty, such as when powering the first computational processing unit itself off, is executed by the second computational processing unit; therefore, the first computational processing unit is used to its maximum effectiveness, and higher processing capability is not demanded of the second computational processing unit.

Note that the information necessary for returning from the power-saving state is information corresponding to the result of computations performed after the first computational processing unit has been started, the result of communicating with the exterior, and so on, and is information that, once deleted, is difficult to restore through programs executed by the first computational processing unit and results in a major loss of time in terms of restoring the state that existed prior to entering the power-saving state. To rephrase, this information is information that has been changed from the startup state of the printing device controller.

Employing the aforementioned configuration makes it possible to realize a higher degree of energy conservation than in the past without greatly increasing the circuit scale, increasing the amount of steady processing, and so on, and makes it possible to smoothly return from the power-saving state simply by rewriting the information necessary for returning from the power-saving state back into the first computational processing unit and changing the refresh mode of the RAM.

As another selective aspect of the invention capable of realizing a power-saving state that further reduces power consumption, the sub control unit may also power off a control circuit of the RAM.

In this case, the main control unit causes the information necessary for returning a control circuit of the RAM from the power-saving state to be stored in the storage unit before the sub control unit powers off the first computational processing unit, and the sub control unit then powers off the control circuit of the RAM. Accordingly, it is possible to realize a power-saving state that saves more power than in the past.

Note that, as with the first computational processing unit, the information necessary for returning the control circuit of the RAM from the power-saving state is information corresponding to the result of computations performed after the control circuit of the RAM has been started, the result of communicating with the exterior, and so on, and is information that, once deleted, is difficult to restore and results in a major loss of time in terms of restoring the state that existed prior to entering the power-saving state.

In addition, a printing device controller according to another aspect of the invention is provided with a first computational processing unit that performs overall control of the device as a whole and a second computational processing unit that consumes less power than the first computational processing unit, and includes a RAM having a self-refresh mode, and a sub control unit whose main processing constituent is the second computational processing unit.

When an instruction to enter a power-saving state is inputted, the sub control unit causes information necessary for returning the first computational processing unit from the power-saving state to be stored in a storage unit and causes the RAM to enter the self-refresh mode, and then powers off the first computational processing unit. In other words, the primary information stored in the first computational processing unit is backed up into the storage unit, and the data currently stored in the RAM is put into a state that can be maintained even without refresh control from the exterior, after which the first computational processing unit is powered off.

Employing the aforementioned configuration makes it possible to realize a higher degree of energy conservation than in the past without greatly increasing the circuit scale, increasing the amount of steady processing, and so on, and makes it possible to smoothly return from the power-saving state simply by rewriting the information necessary for returning from the power-saving state back into the first computational processing unit and changing the refresh mode of the RAM.

As another selective aspect of the invention capable of realizing a power-saving state that further reduces power consumption according to the above aspect, the sub control unit may also power off a control circuit of the RAM.

In this case, the sub control unit causes information necessary for returning a control circuit of the RAM from a power-saving state to be stored in the storage unit, and then powers off the control circuit of the RAM. Accordingly, it is possible to realize a power-saving state that saves more power than in the past.

Note that in this configuration, the sequences of the control for causing the information necessary for returning the first computational processing unit from the power-saving state to be stored in the storage unit, the control for causing the information necessary for returning the control circuit of the RAM from the power-saving state to be stored in the storage unit, and the control for causing the RAM to enter the self-refresh mode can be executed in any order; therefore, if the control is executed without waiting for the other control to be completed, it is possible to execute entry into the power-saving state quickly.

As a selective aspect of a sequence performed when returning from a power-saving state entered as described above, the configuration may be such that when an instruction to return from the power-saving state is inputted, the sub control unit powers on the control circuit and the first computational processing unit, restores the information necessary for returning the first computational processing unit from the power-saving state from the storage unit into the first computational processing unit and restores the information necessary for returning the control circuit from the power-saving state from the storage unit into the control circuit, and then causes the RAM to enter a normal refresh mode.

Returning from a power-saving state through the above sequence makes it possible to return from the power-saving state smoothly while realizing a power-saving state that saves more power than in the past.

As a selective aspect of an instruction to return from a power-saving state, the instruction to return may be a processing request inputted to the printing device controller. In this case, the main control unit executes processing in accordance with the processing request after the sub control unit has caused the RAM to enter the normal refresh mode. In other words, using a process necessary for returning from a power-saving state as a trigger to return from the power-saving state makes it possible to more efficiently return from the power-saving state.

As a selective aspect of the invention that makes it easy to realize power source control, the control executed by the sub control unit, and so on, the second computational processing unit and the storage unit may be disposed within an interface circuit that accepts the processing request for the printing device controller. With the power-saving state according to an aspect of the invention, it is necessary to maintain the supply of power to the interface circuit that accepts the processing request inputted from the exterior of the printing device controller in order to take the processing request as an instruction to return. In addition, it is also necessary to maintain the supply of power to the second computational processing unit that includes the sub control unit, the storage unit. Therefore, if the second computational processing unit, the storage unit, and so on are disposed within the interface circuit, the power source control is possible simply by maintaining the supply of power to that interface circuit, and it is also easily possible to realize the control of the sub control unit.

In addition, as a selective aspect of the invention for reducing as much as possible the chance of erroneous operations occurring in the first computational processing unit, the circuits that include the printing device controller, and so on when realizing the aforementioned power-saving state, the power-saving state may be entered after resetting the first computational processing unit.

In this case, after causing the information necessary for returning the first computational processing unit from the power-saving state to be stored in the storage unit, the sub control unit resets the first computational processing unit before the first computational processing unit is powered off.

In other words, in the case where the main control unit and the sub control unit cooperatively realize entering the power-saving state of the aspect of the invention, after the main control unit causes the information necessary for returning the first computational processing unit from the power-saving state to be stored in the storage unit and causes the RAM to enter the self-refresh mode, the sub control unit resets the first computational processing unit after causing the information necessary for returning the first computational processing unit from the power-saving state to be stored in the storage unit, and then powers off the first computational processing unit.

In addition, in the case where the sub control unit realizes entering the power-saving state of an aspect of the invention, after the sub control unit causes the information necessary for returning the first computational processing unit from the power-saving state to be stored in the storage unit and causes the RAM to enter the self-refresh mode, the sub control unit resets the first computational processing unit after causing the information necessary for returning the first computational processing unit from the power-saving state to be stored in the storage unit, and then powers off the first computational processing unit.

In either case, the first computational processing unit is powered off after being reset, and therefore the printing device controller of an aspect of the invention can smoothly enter the aforementioned power-saving state without the threat of erroneous operations.

As a selective aspect of the invention regarding the RAM entering the self-refresh mode, a pull-down resistor may be connected to a predetermined terminal of the RAM. In this case, the RAM enters the self-refresh mode in response to the predetermined terminal going to a low level, and enters the normal refresh mode in response to the predetermined terminal going to a high level. For example, although the control circuit of the RAM is powered off after the RAM has been caused to enter the self-refresh mode in the aforementioned sequence for entering the power-saving state, there is a chance that noise caused by the powering off will enter the predetermined terminal. Accordingly, pulling down the predetermined terminal reduces the influence of noise, and makes entering the power-saving state smooth. Of course, the pull-down resistor also has an effect of suppressing noise entering the predetermined terminal due to other causes.

The aforementioned printing device controller can be implemented in various forms, such as in a state incorporated into another device such as a printing device, implemented alongside another method. In addition, the aspect of the invention can also be realized as a printing system provided with a printing device into which the printing device controller is incorporated, a control method having processes corresponding to the elements of the printing device controller, a program that causes a computer to implement functions corresponding to the elements of the printing device controller, a computer-readable storage medium on which the program is recorded, and so on. The aspect of the inventions of the printing system, printing device controller control method, printing device controller control program, and the medium on which the program is recorded also have the same advantages and effects as described above. Of course, the configurations described in the second aspect through eighth aspect can also be applied to the printing device, system, method, program, and storage medium.

BRIEF DESCRIPTION OF THE DRAWINGS

The invention will be illustrated with reference to the accompanying drawings, wherein like numbers reference like elements.

DESCRIPTION OF EXEMPLARY EMBODIMENTS

Figure 1:
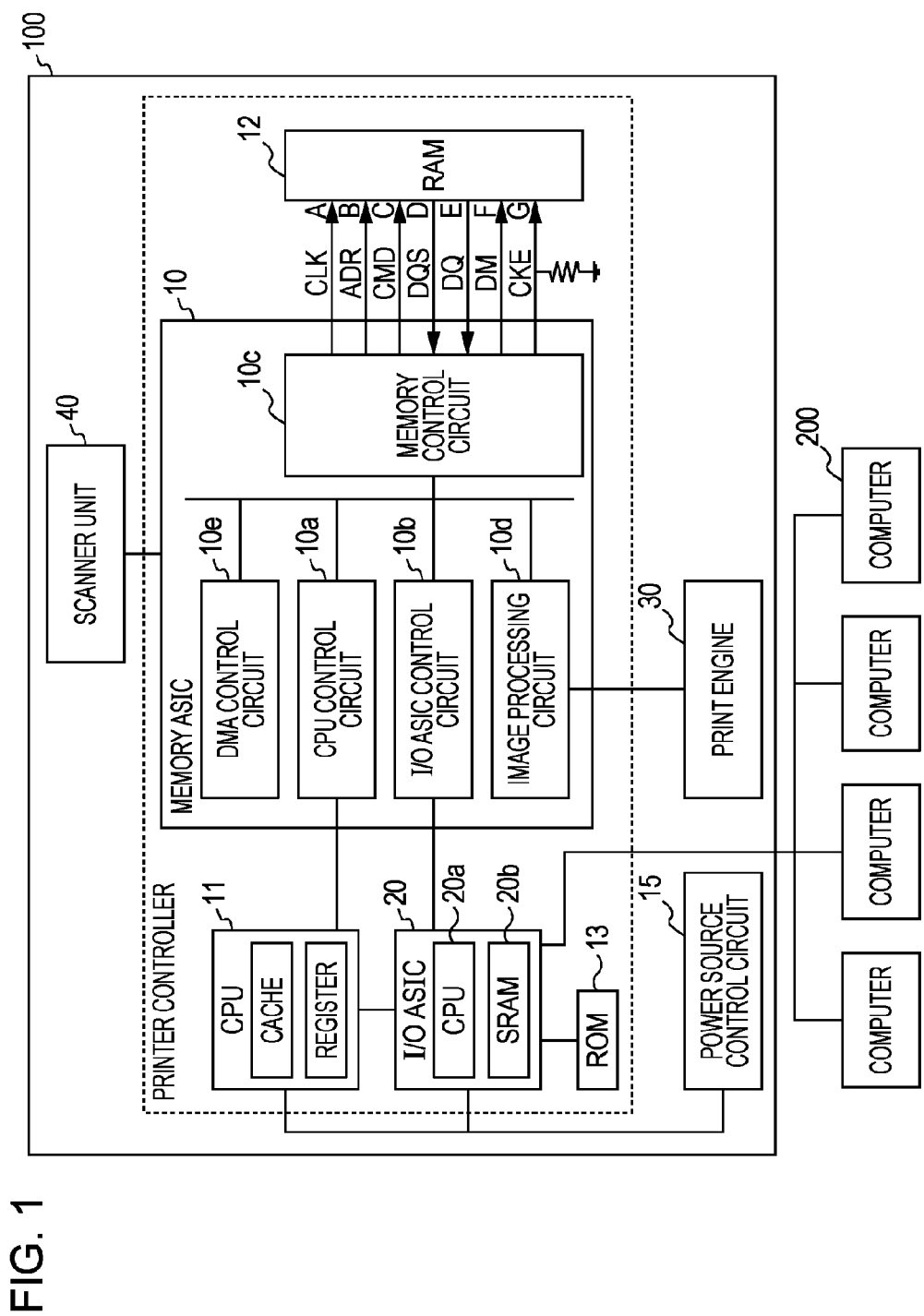
FIG. 1 is a block diagram illustrating the hardware configuration of an embodiment of the invention.

Hereinafter, an embodiment of the invention will be described according to the following order.
(1) Configuration of the Embodiment of the Invention
  (1-1) Hardware Configuration
  (1-2) Software Configuration
(2) Power-Saving Process
(3) Variation
(4) Conclusion (1) CONFIGURATION OF THE EMBODIMENT OF THE INVENTION (1-1) Hardware Configuration FIG. 1 is a block diagram illustrating the hardware configuration of an embodiment of the invention. In the embodiment shown in FIG. 1, a printing device is composed of a printer 100, and a printing device controller is composed of a printer controller. Although the printer 100 illustrated in FIG. 1 is described as a so-called multi-function peripheral that realizes scanner functionality, copying functionality, and so on by providing a scanner unit 40 that obtains image information from a document, it should be noted that the scanner functionality, copying functionality, and so on are only mentioned in order to describe a trigger for returning from a power-saving state, and are not elements necessary to the embodiment of the invention.

As shown in FIG. 1, the printer 100 includes a memory ASIC (Application Specific Integrated Circuit) 10 and an I/O ASIC (Input/Output Application Specific Integrated Circuit) 20. A CPU 11, RAM 12, and ROM 13 are connected to the memory ASIC 10. A print engine 30 is connected to the memory ASIC 10, and the memory ASIC 10 converts inputted print data into data that can be interpreted by the print engine 30 (for example, PWM data or the like) and outputs that data to the print engine 30. The print engine 30 performs a laser printing process by controlling toner cartridges, a photosensitive drum, a laser light irradiation mechanism, a paper transport mechanism, a paper feed/discharge mechanism, and the like (those are not shown) based on the print data. Note that power is supplied to the elements 10 through 13, 20, 30, and 40 from a power supply circuit controlled by a power supply control circuit 15.

The printer 100 expands, in the RAM 12, program data such as firmware or the like stored in the ROM 13 as appropriate under the control of the CPU 11, and the CPU 11 executes computational processes based on that program data, thereby realizing the functions of the printer 100. In other words, the RAM 12 is used as a work area when the printer 100 is controlled. When executing programs, the CPU 11 fetches instructions expanded in the RAM 12 into an instruction fetch unit while caching data in a cache memory capable of faster reads and writes than the RAM 12. The CPU 11 should at least include a cache memory and a computational processing unit that accepts predetermined computational instructions and data inputs and performs computations such as integer arithmetic, floating-point arithmetic; the CPU 11 may be configured singly of an integrated circuit such as a chipset, or may be implemented as a module serving as a part of another integrated circuit. Note that the power source of the CPU 11 can be turned on/off independent of the other elements, as will be described later. The CPU 11 corresponds to a first computational processing unit in the embodiment of the invention.

The RAM 12 includes a terminal A into which a clock signal (CLK) is inputted; a terminal B into which an address signal (ADR) is inputted; a terminal C into which a command signal (CMD) is inputted; a terminal D into which a data strobe signal (DQS) is inputted; a terminal E into which readout data (DQ) is inputted; a terminal F into which a data mask signal (DM) is inputted; and a terminal G into which a clock enable signal (CKE) is inputted. The RAM 12 enters a normal refresh mode when the potential at the terminal G is high-level ("High"), and enters a self-refresh mode when that potential is low-level ("Low").

A pull-down resistor is connected to the terminal G. Therefore, when a "Low" signal is inputted into the terminal G, that "Low" is maintained even if a slight amount of noise is overlapped to the terminal G line. Note that if the RAM 12 enters a normal refresh mode when the terminal G is "Low" and enters a self-refresh mode when the terminal G is "High", which is the opposite of the embodiment, a pull-up resistor may instead be connected to the terminal G. In other words, by adding a bias so that the signal level at the terminal G at the time of the refresh mode is maintained, the level at the terminal G is unlikely to fluctuate even if noise or the like enters into the terminal G line when the power to the memory ASIC 10 is turned off during the power-saving process mentioned later; this makes it difficult for the refresh mode to be mistakenly exited. This terminal G corresponds to a predetermined terminal in the embodiment of the invention.

In the normal refresh mode, the RAM 12 performs refresh operations under the control of a memory control circuit 10c of the memory ASIC 10. At this time, the RAM 12 generates an internal clock using an internal clock generation circuit (not shown), and corrects the error between an external clock and the internal clock using a DLL (Delay Locked Loop) circuit, thereby synchronizing the clocks with each other. Meanwhile, when in the self-refresh mode, the RAM 12 stops the internal clock generation circuit, and automatically executes refresh operations using an internal refresh counter. During this time, the DLL circuit is unnecessary and is therefore stopped, and thus the power consumption is reduced by the amount normally consumed by the internal clock generation circuit and the DLL circuit.

The memory ASIC 10 includes an I/O ASIC control circuit 10b, an image processing circuit 10d, and a CPU control circuit 10a in addition to the memory control circuit 10c that controls the RAM 12.

The CPU control circuit 10a is connected to the CPU 11, and functions as an interface for performing signal conversion between the CPU 11 and the memory ASIC 10.

The RAM 11 is connected to the memory control circuit 10c; the memory control circuit 10c holds decode range information of the RAM 12, delay timing information (a Wait number) for single reads and burst reads of the RAM 12, refresh interval information of the RAM 12, and so on as register values, and functions as an interface for performing signal conversion between the RAM 12 and the memory ASIC 10 using those register values. The memory control circuit 10c corresponds to a circuit that controls a RAM in the embodiment of the invention, and "powering off the memory ASIC 10" corresponds to "powering off the control circuit of the RAM" in the embodiment of the invention.

The I/O ASIC control circuit 10b is connected to the I/O ASIC 20, and supplies print data inputted from the I/O ASIC 20 to a DMA control circuit 10e. The I/O ASIC 20 is a communication interface for receiving print data from an external device such as a computer 200 or the like, and is, for example, an interface based on the USB (Universal Serial Bus) standard, an interface for connecting to a LAN (Local Area Network), or the like. Upon receiving the print data, the I/O ASIC 20 outputs the print data to the I/O ASIC control circuit 10b.

The I/O ASIC 20 is an integrated circuit provided with a CPU 20a and an SRAM (Static Random Access Memory) 20b. This I/O ASIC 20 corresponds to an interface circuit in the embodiment, and the SRAM 20b corresponds to a storage unit in the embodiment. The I/O ASIC 20 is communicably connected to the CPU 11, and the CPU 20a is capable of accessing the internal registers, cache memory, and so on of the CPU 11. Therefore, the CPU 20a is capable of saving register values, cache memory content, and so on of the CPU 11 into its own SRAM 20b, and rewriting into the registers, cache memory, and so on of the CPU 11, without traversing the memory ASIC 10. Furthermore, the CPU 20a is capable of resetting the CPU 11. For example, the CPU 20a resets the CPU 11 by writing a "1" into a predetermined register in the CPU 11 (called a "reset register" hereinafter), and stops the reset of the CPU 11 by writing a "0" into the reset register.

In addition, the ROM 13, in which firmware FW executed by the CPU 11, the CPU 20a, and so on is stored, is connected to the I/O ASIC 20. Note that when the CPU 11 expands the firmware of the ROM 13 in the RAM 12, it expands through the I/O ASIC 20 and the memory ASIC 10. Of course, a separate ROM for storing the firmware executed by the CPU 11 may be provided, and that ROM may be connected to the memory ASIC 10. If a ROM is connected to the memory ASIC 10, it is possible for the memory control circuit 10c to hold decode range information, delay timing information for single reads and burst reads, and so on of the ROM as register values, and perform control based thereupon. In this case, these ROM register values can be included in "power-saving state return necessary information", which will be described later.

As described above, the I/O ASIC 20 includes a program execution environment, and therefore a power-saving process can easily be implemented using the I/O ASIC 20. The CPU 20a corresponds to a second computational processing unit in the embodiment, and the SRAM 20b corresponds to a storage unit. However, the storage unit of the embodiment of the invention is not limited to the SRAM 20b, and may be any storage medium capable of holding data while in a power-saving state as well; the storage unit may be a storage medium connected to the I/O ASIC 20 externally, or an external storage unit may be connected to the I/O ASIC 20 and that external storage unit may then be used. Meanwhile, the second computational processing unit of the embodiment of the invention should at least include a computational processing unit that accepts predetermined computational instructions and data inputs and performs computations such as integer arithmetic, floating-point arithmetic, and, as described in the embodiment, may be configured singly of an integrated circuit such as a chipset, or may be implemented as a module serving as a part of another integrated circuit.

While the CPU 11 performs overall control of the device as a whole, the CPU 20a performs processes for monitoring signals, print data, and so on inputted to the I/O ASIC 20 from outside of the printer 100, relaying those signals, data, and so on to the memory ASIC 10, and so on. Therefore, it is sufficient for the CPU 20a to have lower processing power, cache memory capabilities, and so on than the CPU 11, and thus a CPU that consumes less power than the CPU 11 is employed as the CPU 20a.

In addition, the CPU 20a is capable of control for selecting elements to which power is supplied, the elements of the power supply circuit are controlled by the power source control circuit 15. With respect to the power supply lines of the power source circuit, the power supply lines to at least the CPU 11 and the memory ASIC 10 are capable of being controlled on/off independent of one another. Therefore, the CPU 20a can control the power supply source circuit 15 to power off the CPU 11 only, or power off the memory ASIC 10 only, and so on. Of course, the power supply lines to the other elements 12 through 14, 20, 30, and 40 may also be independent of one another. In addition, it is also possible for the CPU 11 to control the power source control circuit 15 so as to control the power supply lines to the various elements in the same manner as the CPU 20a, and the CPU 20a to control the power source control circuit 15 to power off the CPU 11 only, or power off the memory ASIC 10 only, and so on.

In addition, of the elements to which power is supplied by the power source circuit under the control of the power source control circuit 15, the power supply line to the CPU 11 and the memory ASIC 10, the power supply of which is stopped during the power-saving state, and the power supply line to the I/O ASIC 20, the power supply of which is maintained during the power-saving state, are independent from each other. Accordingly, the CPU 20a serving as the second computational processing unit and the SRAM 20b serving as the storage unit, to which the power supply is to be maintained during the power-saving state, are integrated as the I/O ASIC 20, thereby making it easy to control the power source.

The DMA control circuit 10e receives print data sent from the computer 200 or the like via the I/O ASIC 20 and the I/O ASIC control circuit 10b, and stores that data in the RAM 12. Furthermore, the DMA control circuit 10e obtains the print data in the RAM 12 one page's worth at a time under the control of the CPU 11, and supplies that data to the image processing circuit 10d.

The image processing circuit 10d generates print data that can be interpreted by the print engine 30. The image processing circuit 10d generates, for example, bitmap image data based on the print data generated by the computer 200, in which each pixel is expressed as a tonal value of RGB colors, while causing a language interpretation unit to interpret the print job language of the print data as necessary; performs color conversion processing (for example, color conversion from the RGB color space to the CMYK color space), halftone processing, and rasterizing processing, while performing resolution conversion processing as necessary, thereby generating image data of each of the CMYK planes as print data; and sequentially sends the generated print data to the print engine 30. The print engine 30 controls the toner cartridges, photosensitive drums, laser light irradiation mechanism, paper transport mechanism, and the paper feed/discharge mechanism based on the print data, thereby performing a laser printing process.

(1-2) Software Configuration

Figure 2:
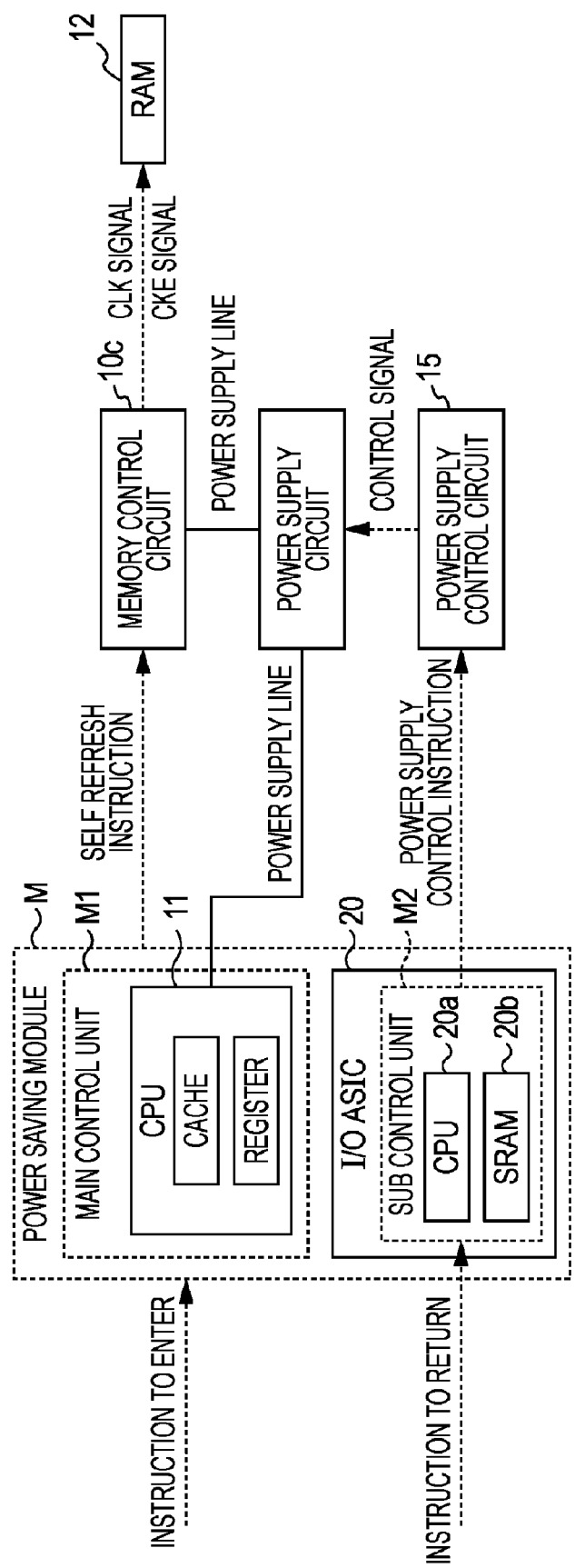
FIG. 2 is a block diagram illustrating the software configuration of an embodiment of the invention.

FIG. 2 is a block diagram illustrating a software configuration realized by executing firmware in a printer controller serving as an embodiment of the invention. As shown in FIG. 2, the firmware executed in the printer controller includes a power-saving module M. This power-saving module M may be realized through cooperative operations of programs executed by both the aforementioned CPU 11 and CPU 20a, or may be realized by a program executed by the CPU 20a alone. In the case of the former, a process corresponding to the power-saving process mentioned later is executed, whereas in the case of the latter, a process corresponding to the variation mentioned later is executed. Note that in the embodiment, in the power-saving module M, the focus of the computational processing performed by the CPU 11 is a main control unit M1, whereas the focus of the computational processing performed by the CPU 20a is a sub control unit M2.

(2) POWER-SAVING PROCESS

Figure 3:
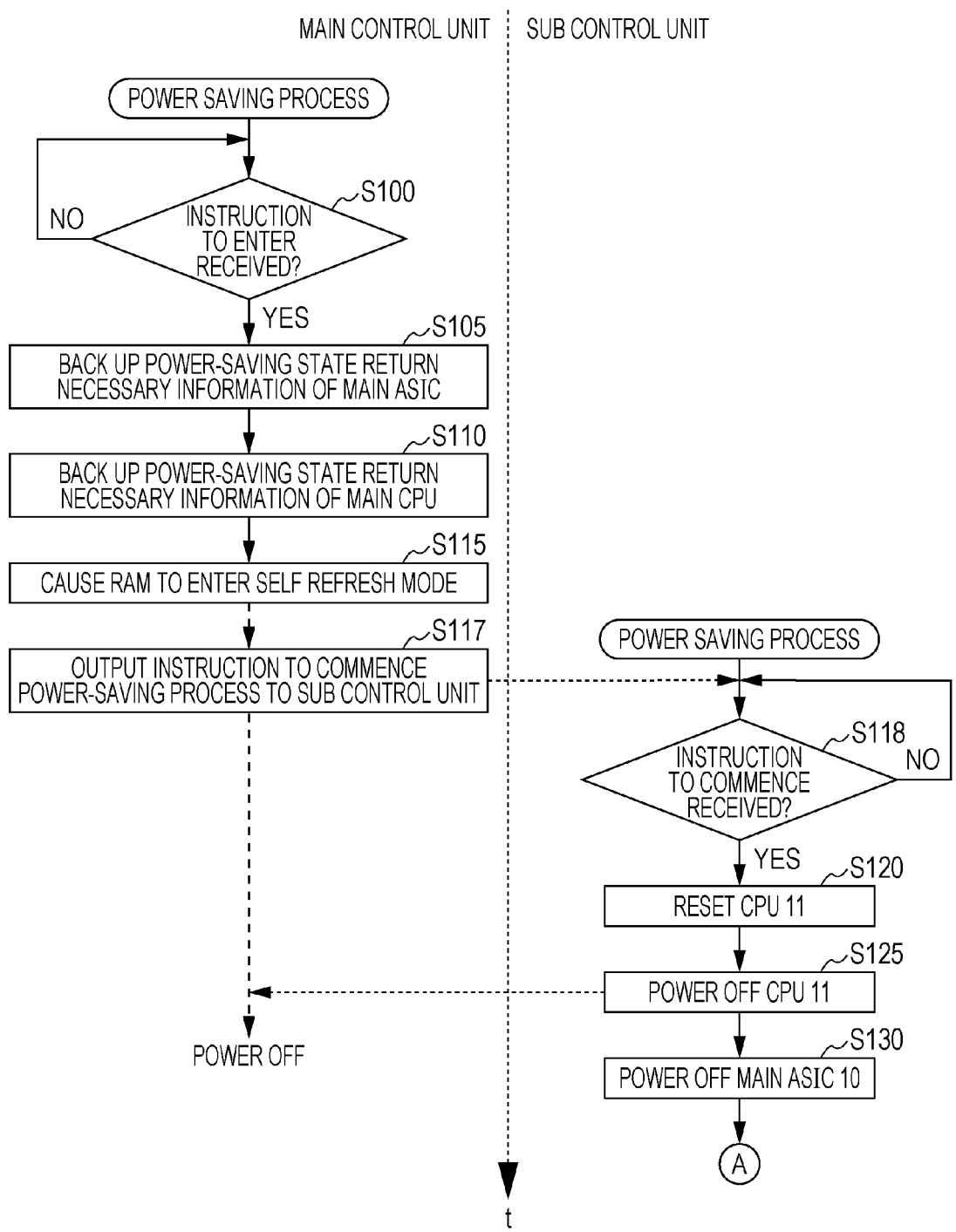
FIG. 3 is a flowchart illustrating a power-saving process.
Figure 4:
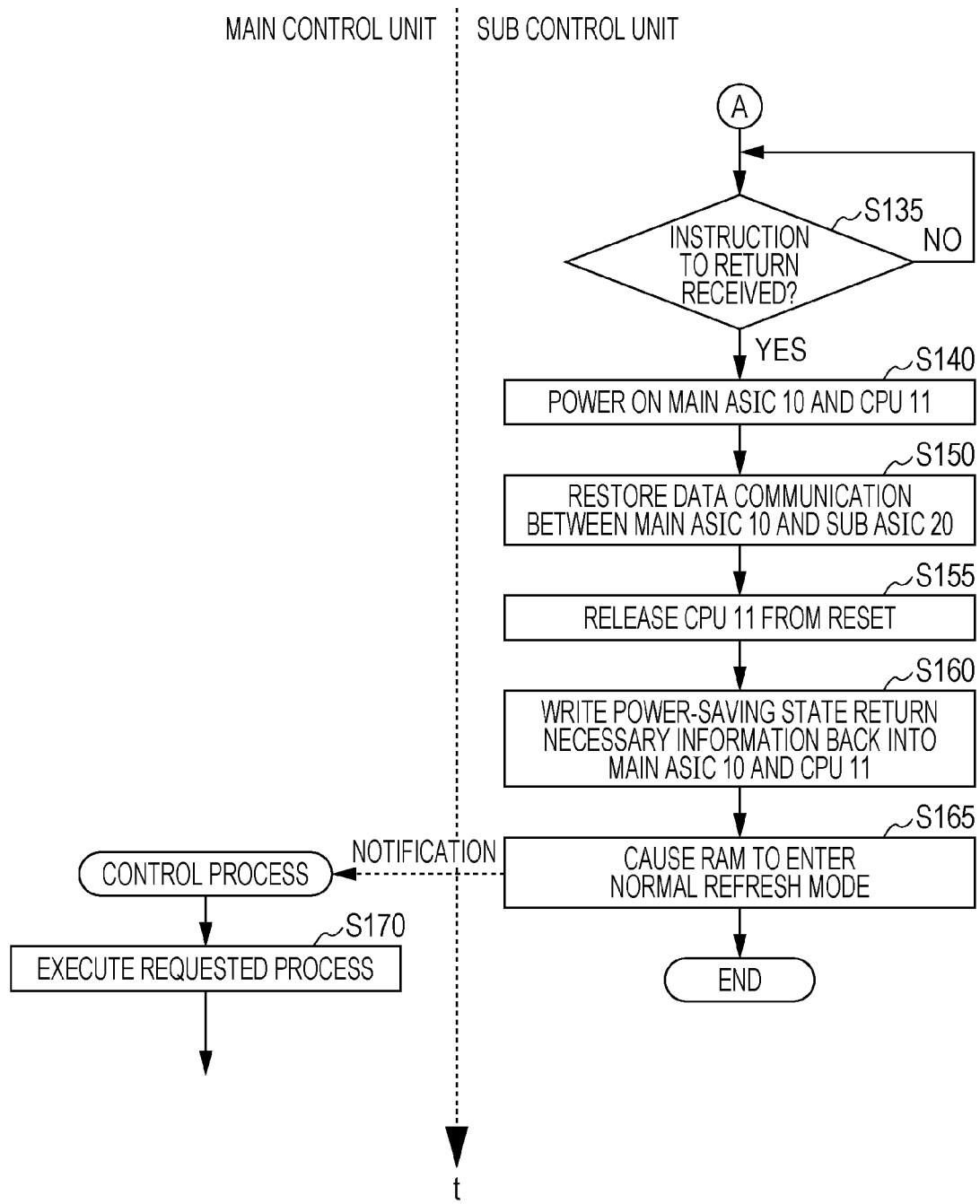
FIG. 4 is a flowchart illustrating a power-saving process.
Figure 5:
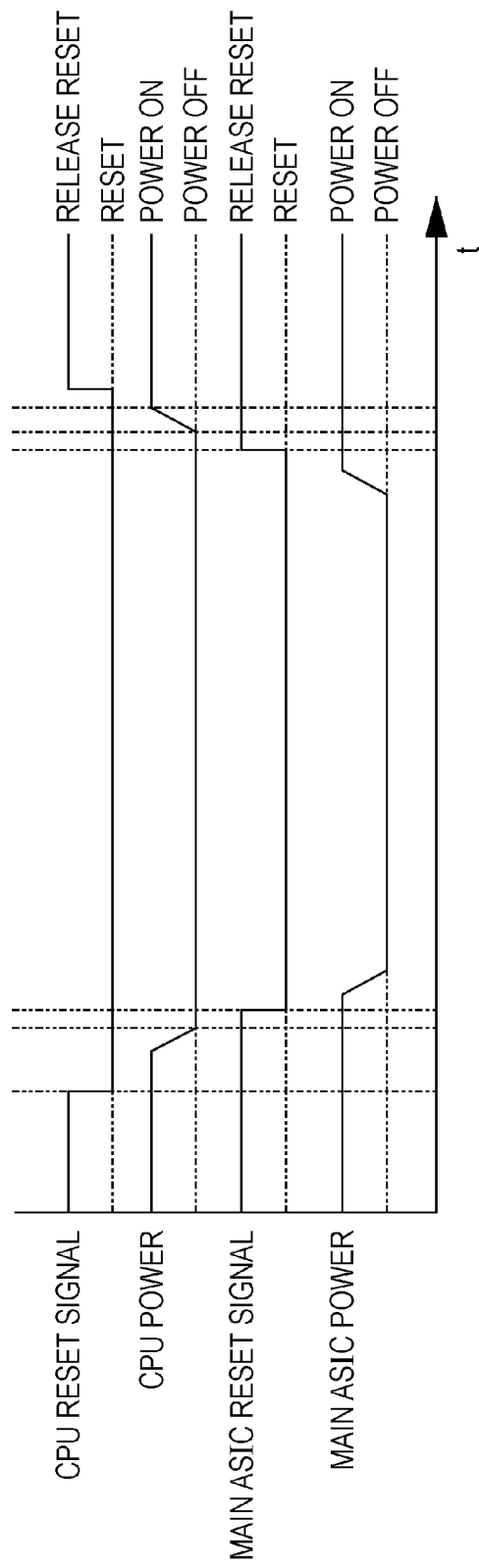
FIG. 5 is a timing chart of signals generated during the power-saving process.

FIGS. 3 and 4 are flowcharts of a power-saving process executed cooperatively by the main control unit M1 and the sub control unit M2 of the power-saving module M, and FIG. 5 is a timing chart of signals generated in the power-saving process. The power-saving process according to the embodiment is repeatedly executed while the printer 100 is running.

In process S100 ("process" will not be expressly written hereinafter), the main control unit M1 determines whether or not an instruction to enter the power-saving mode has been received. Various forms can be employed by setting the timing at which the instruction to enter to occur within the program in advance. For example, lacking of user operations for a predetermined amount of time by counting a clock signal or the like, an instruction entering to the power-saving state made through panel operations, and so on can be employed. The main control unit M1 advances the processing to S105 in the case where the instruction to enter has been received, and repeats the determination in S100 in the case where the instruction to enter has not been received.

In S105, the main control unit M1 stores, in the SRAM 20b of the I/O ASIC 20, information necessary for returning from the power-saving state (called "power-saving state return necessary information" hereinafter) stored in the memory ASIC 10. The "power-saving state return necessary information" stored in the memory ASIC 10 as register values includes, for example, delay timing information for communication with the peripheral elements of the ASIC 10 (the CPU 11, the RAM 12, the ROM 13, an operational panel (not shown), the I/O ASIC 20, the print engine 30, and so on), information indicating the decode range of the RAM 12, ROM 13, and so on, information indicating the refresh interval of the RAM, information indicating the signal timing of the ROM, and so on.

In S110, the main control unit M1 causes the "power-saving state return necessary information" stored in the CPU 11 to be stored in the SRAM 20b of the I/O ASIC 20. In the "power-saving state return necessary information" stored in the CPU 11 are the cache of the cache memory, address pointers for the instruction stored at the start of the instruction fetch unit, and so on.

In S115, the main control unit M1 causes the RAM 12 to enter the self-refresh mode. In other words, the main control unit M1 outputs a self-refresh instruction to the memory ASIC 10, thereby controlling the terminal G to go to "Low".

Then, in S117, the main control unit M1 outputs an instruction to start the power-saving process to the sub control unit, and ends the power-saving process. Because the sub control unit M2 is repeatedly executing the power-saving process from S118 on while the printer 100 is running, when a start instruction has been inputted from the main control unit M1, the sub control unit M2 receives that instruction.

In S118, the sub control unit M2 determines whether or not an instruction to start the power-saving process has been inputted. The sub control unit M2 advances the processing to S120 in the case where an instruction to start the power-saving process has been inputted, and repeats the determination of S118 in the case where an instruction to start the power-saving process has not been inputted.

In S120, the sub control unit M2 resets the CPU 11. The sub control unit M2 accesses the reset register of the CPU 11, and rewrites that register value with "1". The CPU 11 enters a reset state, and thus does not perform erroneous operations even if the power supply drops below a specified value.

In S125, the sub control unit M2 powers the CPU 11 off. The sub control unit M2 controls the power source control circuit 15 to stop supply of power to the power supply line of the CPU 11. For example, the sub control unit M2 sends a power supply control instruction to the power source control circuit 15, thereby stopping the supply of power to the power supply line leading to the CPU 11.

In S130, the sub control unit M2 powers the memory ASIC 10 off. The sub control unit M2 sends a power supply control instruction to the power source control circuit 15, thereby stopping supply of power to the power supply line of the memory ASIC 10. When the power supply to the memory ASIC 10 stopped, the memory ASIC 10 automatically enters a reset state before powering off.

In S135, the sub control unit M2 determines whether or not an instruction to return from the power-saving state has been inputted. Various forms may be used for this instruction to return, and using, for example, an operation made through an operational panel (not shown), an input of a packet such as a print request from the computer 200 or a request to return from the power-saving state, a detection of the cover of the document glass in the scanner unit 40 being open, a detection of a cover for the toner, drum, or the like of the printer 100 or a paper tray being open, and so on as the instruction to return can be considered. In other words, the sub control unit M2 starts the process for returning from the power-saving state using, as a trigger, the occurrence of an event that cannot be executed unless the power-saving state is exited and the normal state is entered. The events that correspond to such an instruction to return are set in the power-saving processing program in advance. The sub control unit M2 advances the processing to S140 in the case where the instruction to return has been inputted, and repeats the processing of S135 in the case where the instruction to return has not been inputted.

In S140, the sub control unit M2 powers the memory ASIC 10 and the CPU 11 on. The sub control unit M2 sends a power supply control instruction to the power source control circuit 15, thereby starting supply of power to the power supply lines of the memory ASIC 10 and the CPU 11. Then, the memory ASIC 10 automatically exits the reset state.

In S150, the sub control unit M2 restores the data communication between the memory ASIC 10 and the I/O ASIC 20. In other words, port numbers used by the memory ASIC 10 when communicating with the I/O ASIC 20, an identification number of the I/O ASIC 20 when communicating processing requests to the memory ASIC 10, and so on are set, and the clocks and so on thereof are synchronized.

In S155, the sub control unit M2 causes the CPU 11 to exit the reset state. The CPU 11 exits the reset state after standing by for a predetermined amount of time after the power source circuit controlled by the power source control circuit 15 commences the supply of power and the potential in the power supply line reaches its default potential. This avoids a situation in which the CPU 11 commences operations within insufficient potential and therefore performs erroneous operations.

In S160, the sub control unit M2 rewrites the "power-saving state return necessary information", which has been saved in the SRAM 20b of the I/O ASIC 20, back into the memory ASIC 10 and the CPU 11. By overwriting the default register values restored by the firmware with the "power-saving state return necessary information", the memory ASIC 10 and the CPU 11 can be returned to the state before they were entering the power-saving state.

In S165, the sub control unit M2 causes the RAM 12 to return to the normal transfer mode from the self-refresh mode. The sub control unit M2 controls the memory ASIC 10 so that the terminal G goes to "High". This RAM 12 mode change is executed after the CPU 11, which inputs a refresh signal based on an external clock into the RAM 12, has completely restarted. When the above processing finishes, the sub control unit M2 communicates an operation instruction corresponding to the instruction to return received in S135 to the main control unit M1, thereby stopping the power-saving processing sequence, and then repeatedly executes the processing of S118, whereby an instruction to enter the power-saving state inputted from the main control unit M1 is monitored.

In S170, the main control unit M1 processes the operation instruction that served as a trigger to return from the power-saving state. For example, if a print request served as the trigger for returning, reception of the print data is commenced, and the printing process is executed. By entering and returning from the power-saving state according to the aforementioned sequence, returning from the power-saving state can be performed in a smooth manner.

(3) VARIATION

Figure 6:
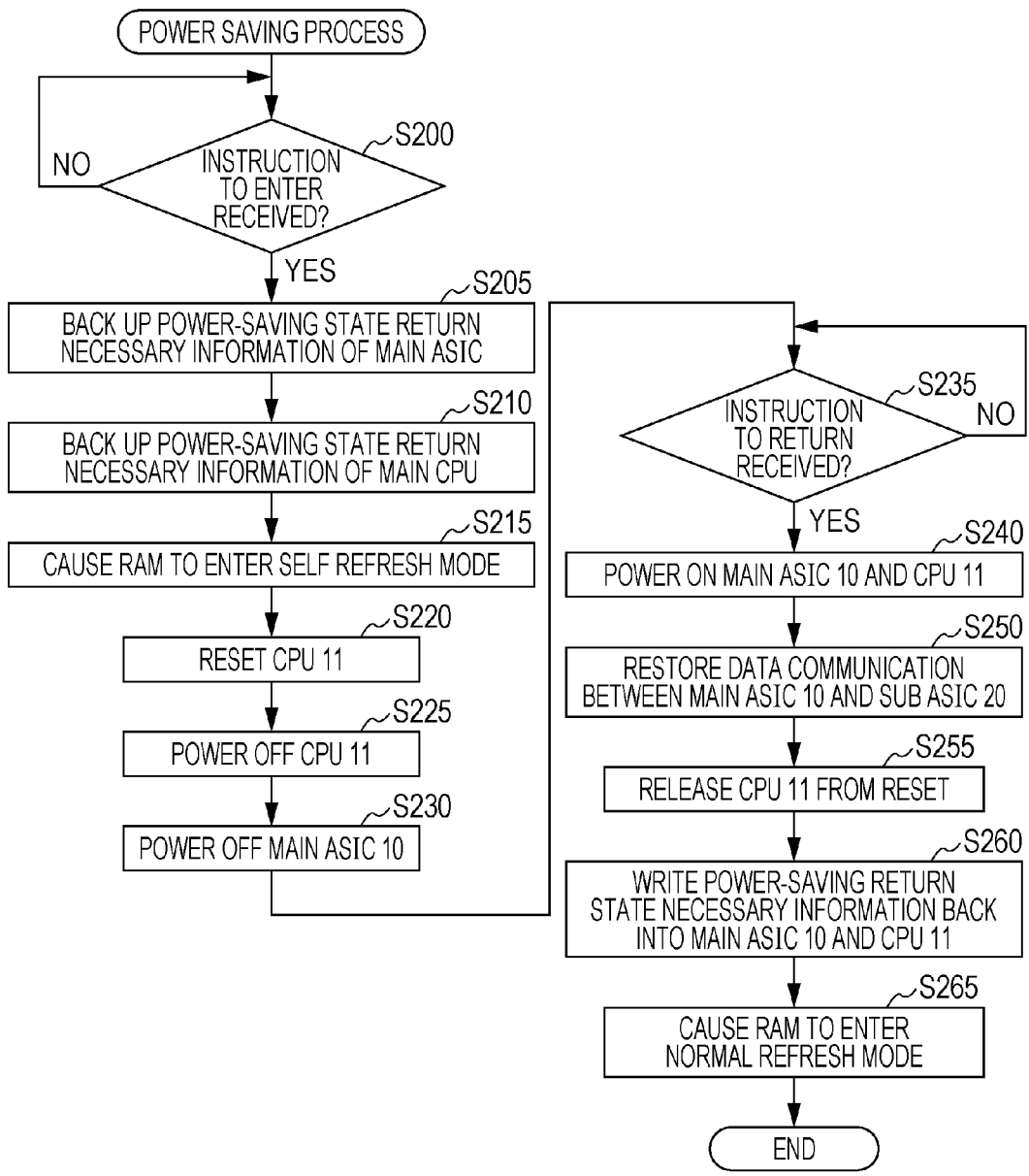
FIG. 6 is a flowchart illustrating a variation on a power-saving process.

FIG. 6 is a flowchart of a variation on the power-saving process executed by the sub control unit M2 of the power-saving module M. The signal timing generated in the variation is the same as that of the timing chart in FIG. 5. The power-saving process according to the embodiment is repeatedly executed while the printer 100 is running Note that the processing of the variation basically only differs in terms of the aforementioned power-saving process and the entities that execute control, and thus only in outline will be described.

In S200, the sub control unit M2 determines whether or not an instruction to enter the power-saving state has been received. The sub control unit M2 advances the processing to S205 in the case where the instruction to enter has been received, and repeats the determination in S200 in the case where the instruction to enter has not been received.

In S205, the sub control unit M2 causes the "power-saving state return necessary information" stored in the memory ASIC 10 to be stored in the SRAM 20b of the I/O ASIC 20.

In S210, the sub control unit M2 causes the "power-saving state return necessary information" stored in the CPU 11 to be stored in the SRAM 20b of the I/O ASIC 20.

In S215, the sub control unit M2 causes the RAM 12 to enter the self-refresh mode. The processes of S205 to S215 described above can be executed in random order.

In S220, the sub control unit M2 resets the CPU 11.

In S225, the sub control unit M2 powers the CPU 11 off.

In S230, the sub control unit M2 powers the memory ASIC 10 off.

In S235, the sub control unit M2 determines whether or not an instruction to return from the power-saving state has been inputted. The sub control unit M2 advances the processing to S240 in the case where the instruction to return has been inputted, and repeats the processing of S235 in the case where the instruction to return has not been inputted.

In S240, the sub control unit M2 powers the memory ASIC 10 and the CPU 11 on. Then, the memory ASIC 10 exits the reset state.

In S250, the sub control unit M2 restores the data communication between the memory ASIC 10 and the I/O ASIC 20.

In S255, the sub control unit M2 causes the CPU 11 to exit the reset state.

In S260, the sub control unit M2 rewrites the "power-saving state return necessary information", which has been saved in the SRAM 20b of the I/O ASIC 20, back into the memory ASIC 10 and the CPU 11.

In S265, the sub control unit M2 causes the RAM 12 to return to the normal transfer mode from the self-refresh mode. When the above processing finishes, the sub control unit M2 communicates an operation instruction corresponding to the instruction to return received in S135 to the main control unit M1, thereby stopping the power-saving processing sequence, and then repeatedly executes the processing of S200, whereby an instruction to enter the power-saving state inputted from the main control unit M1 is monitored. Then, the main control unit M1 processes the operation instruction that served as a trigger to return from the power-saving state.

By entering and returning from the power-saving state according to the aforementioned sequence, returning from the power-saving state can be performed in a smooth manner.

(4) CONCLUSION

In the embodiment described above, a printer controller provided with the CPU 11 that performs overall control of the device as a whole and the CPU 20*a* that consumes less power than the CPU 11 is also provided with the RAM 12, which has a self-refresh mode, and a sub control unit M2 that, when an instruction to enter a power-saving state is inputted, stops the supply of power to the CPU 11 after causing information necessary for returning the CPU 11 from the power-saving state to be stored in the SRAM 20*b* and causing the RAM 12 to enter the self-refresh mode. Accordingly, it is possible to contribute to power consumption by reducing the power consumed without greatly increasing the circuit scale, increasing the amount of steady processing, and so on, and smoothly enter a power-saving state and smoothly return from the power-saving state.

Note that the invention is not limited to the aforementioned embodiment, variation, and so on, and also includes configurations in which the elements disclosed in the aforementioned embodiment and variation are exchanged with one another or have had their combinations changed, configurations in which the elements disclosed in known techniques and the aforementioned embodiment and variation are exchanged with one another or have had their combinations changed.

The entire disclosure of Japanese Patent Application No. 2009-041050, filed Feb. 24, 2009 is expressly incorporated by reference herein.

What is claimed is:

1. A printing device controller provided with a first computational processing unit that performs overall control of the device as a whole and a second computational processing unit that consumes less power than the first computational processing unit, the printing device controller comprising:
   a RAM (Random Access Memory) having a self-refresh mode;
   a main control unit whose main processing constituent is the first computational processing unit; and
   a sub control unit whose main processing constituent is the second computational processing unit,
   wherein when an instruction to enter a power-saving state is inputted, the main control unit causes the first computational processing unit to store information necessary for returning from the power-saving state into a storage unit and then causes the RAM to enter the self-refresh mode; and
   the sub control unit then powers off the first computational processing unit.

2. The printing device controller according to claim 1, wherein the main control unit causes the information necessary for returning a control circuit of the RAM from the power-saving state to be stored in the storage unit before the sub control unit powers off the first computational processing unit; and
   the sub control unit then powers off the control circuit of the RAM.

3. The printing device controller according to claim 2, wherein when an instruction to return from the power-saving state is inputted, the sub control unit powers on the control circuit and the first computational processing unit, restores the information necessary for returning the first computational processing unit from the power-saving state from the storage unit into the first computational processing unit and restores the information necessary for returning the control circuit from the power-saving state from the storage unit into the control circuit, and then causes the RAM to enter a normal refresh mode.

4. The printing device controller according to claim 3, wherein the instruction to return is a processing request inputted to the printing device controller; and
   the main control unit executes processing in accordance with the processing request after the sub control unit has caused the RAM to enter the normal refresh mode.

5. The printing device controller according to claim 4, wherein the second computational processing unit and the storage unit are disposed within an interface circuit that accepts the processing request for the printing device controller.

6. The printing device controller according to claim 1, wherein, after causing the information necessary for returning the first computational processing unit from the power-saving state to be stored in the storage unit, the sub control unit resets the first computational processing unit before the first computational processing unit is powered off.

7. The printing device controller according to claim 1, wherein the RAM enters the self-refresh mode in response to a predetermined terminal going to a low level, enters the normal refresh mode in response to the predetermined terminal going to a high level, and a pull-down resistor is connected to the predetermined terminal.

8. A printing device controller provided with a first computational processing unit that performs overall control of the device as a whole and a second computational processing unit that consumes less power than the first computational processing unit, the printing device controller comprising:
   a RAM (Random Access Memory) having a self-refresh mode; and
   a sub control unit whose main processing constituent is the second computational processing unit,
   wherein when an instruction to enter a power-saving state is inputted, the sub control unit causes information necessary for returning the first computational processing unit from the power-saving state to be stored in a storage unit and causes the RAM to enter the self-refresh mode, and then powers off the first computational processing unit.

9. The printing device controller according to claim 8, wherein the sub control unit causes information necessary for returning a control circuit of the RAM from a power-saving state to be stored in the storage unit, and then powers off the control circuit of the RAM.

10. A printing device provided with a first computational processing unit that performs overall control of the device as a whole and a second computational processing unit that consumes less power than the first computational processing unit, the printing device comprising:
    a RAM (Random Access Memory) having a self-refresh mode;
    a main control unit whose main processing constituent is the first computational processing unit; and
    a sub control unit whose main processing constituent is the second computational processing unit,
    wherein when an instruction to enter a power-saving state is inputted, the main control unit causes the first computational processing unit to store information necessary for returning from the power-saving state into a storage unit and then causes the RAM to enter the self-refresh mode; and
    the sub control unit then powers off the first computational processing unit.

* * * * *